Feb. 28, 1967  C. A. PRATT  3,307,013
ELECTRIC ARC TORCHES
Filed Aug. 10, 1966

CHAPIN A. PRATT
INVENTOR

BY Wm O Moeser

3,307,013
ELECTRIC ARC TORCHES
Chapin A. Pratt, Lebanon, N.H., assignor to Thermal Dynamics Corporation, Lebanon, N.H., a corporation of New Hampshire
Filed Aug. 10, 1966, Ser. No. 571,449
3 Claims. (Cl. 219—136)

My invention relates to welding devices and processes, and relates more particularly to improved means for applying plasma-arc electric arc torches to the art of welding.

Electric arc torches generating a gas stabilized arc column and an effluent including hot gases at least partially in the plasma state have found increasing application to a variety of industrial processes. One important application is in fusion welding, where the arc column is directed at the interface of two segments to be joined. The principal functions of the plasma forming gas are (a) to gas-stabilize the arc column centrally in the torch nozzle passageway and (b) to produce in the external portion of the arc column sufficient stiffness to permit its being directed precisely to the weld zone. While in many uses of electric arc torches the plasma effluent is an important heat transfer agent, in welding the arc column and the resulting anode heating effect on the material to be joined is the primary operative mechanism. The gas, although producing the desired arc characteristics, also produces an undesirable application of heat to the zones adjacent to the weld line.

To assist in further focusing the arc at the weld juncture and to protect the work from undesirable effects of the plasma stream are the principal purposes of my invention.

Figure 1:
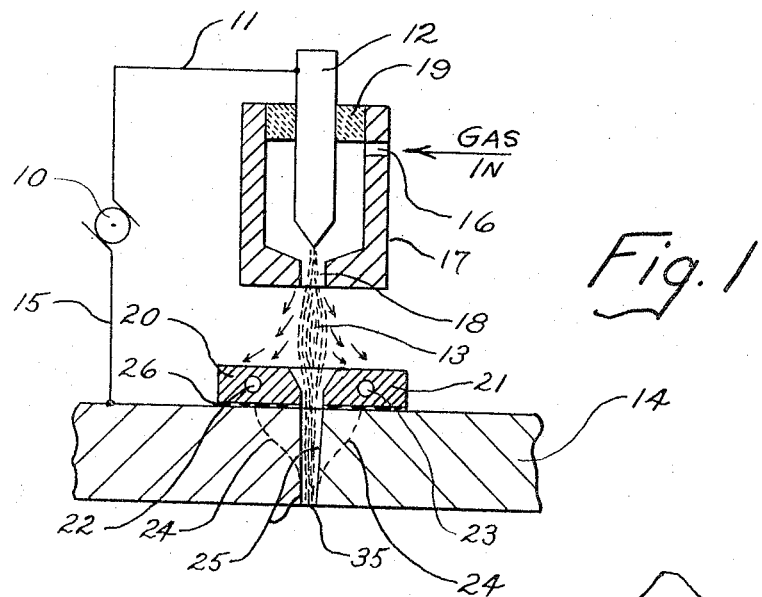
Figure 2:
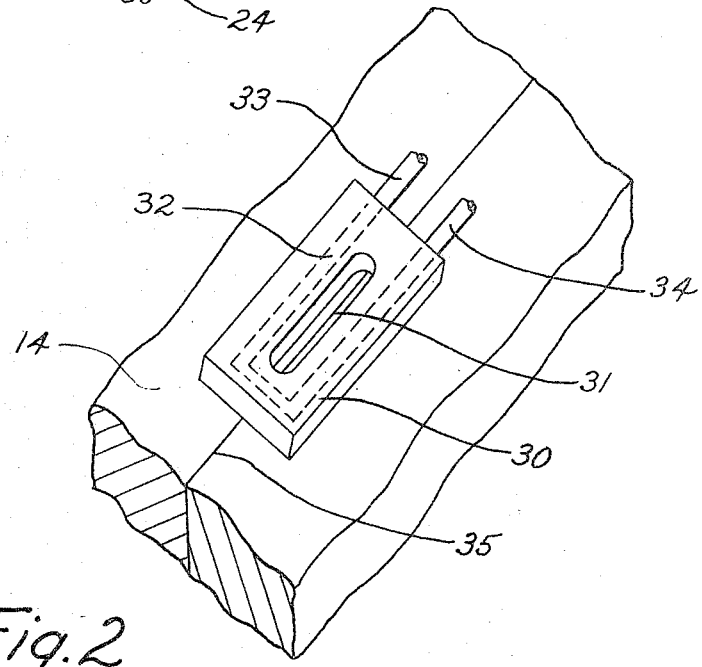

For a more complete understanding of this invention, I now refer in detail to the accompanying drawing, in which FIGURE 1 is a view in cross-section of a simplified plasma forming electric arc torch in operation in accordance with the invention;

FIGURE 2 is a view in perspective of a component modification from FIGURE 1.

Referring now more particularly to FIGURE 1, I show a torch body 17 defining a plenum chamber opening with a nozzle passageway 18. An electrode 12 is mounted within the body 17 and is electrically separated therefrom by a ceramic closure 19. A suitable power supply 10 is connected by leads 11 and 15 to electrode 12 and a workpiece 14 respectively. The power supply 10 is capable of establishing and maintaining an arc column 13 between electrode 12 and the workpiece 14. An arc stabilizing gas is introduced under pressure at inlet 16, emerges around the arc column from the passageway 18, and then fans out as shown by the arrows in FIGURE 1. It should be understood that the workpiece 14 is in two sections mechanically abutted together to be joined by fusion along the interface.

To accomplish this the arc column 13 impinges on the work at the interface 35. The momentum of the gas contained within and around the arc column forces the arc to penetrate entirely through the workpiece producing what is called a "keyhole" with the weld zone extending down through the workpiece in the shape as shown by the dotted lines 24. Molten metal forms the weld bead and the pieces are effectively joined without the addition of metal. It is desirable to keep the weld zone as narrow as possible; and this is effectively accomplished at the portion of the joint remote from the torch, thus creating the wineglass shape. Near the top surface, however, the weld zone broadens due to the spreading out of the plasma stream which flows over the surface and produces a fused zone as defined by dotted lines 24. The enlargement of the top of the weld zone is entirely unnecessary for effective joining of the work, and furthermore produces undesirable metallurgical effects over an unnecessarily extended region on the work.

To overcome this, I interpose between the torch and the work shielding bars 20 and 21 lying along the line to be welded. It is known to employ so-called "chill bars" in certain types of arc welding (such as TIG). Such bars, however, are heat sinks to carry off heat which has already been invested in the work.

My shielding bars serve a two-fold purpose, neither of which is as a heat sink. First, my bars are very closely spaced. I have found a good working rule to be a spacing of about one-half of the thickness of the metal being welded. This close spacing defines a narrow arc passageway which acts in effect like a resumption of the nozzle passageway 18. The natural tendency of the arc column 13 to open up is thus reversed and the arc, still very stiff as compared with an open arc, narrows down and is thus effectively driven deeper into the work. The second function of the bars 20 and 21 is to provide a baffle to shield the top face of the work from the plasma stream which is spreading out as indicated in FIGURE 1 to an even greater extent than the arc column itself. By this means, the annular zone of heat around the arc column, represented for the most part by gases in the plasma state, is kept from entering the work.

To keep the shield bars 20 and 21 effective over extended periods of welding, I provide passages 22 and 23 through which cooling water may be passed. The arc-pinching effect of the narrow zone between the bars 20 and 21 is enhanced by keeping the bars relatively cool. This counteracts the tendency the arc might otherwise have of attaching itself directly to one or both bars. A slight taper on the inner surfaces of the shield bars provides a throat to aid in keeping the arc centered on the weld line.

To further insure that the arc action will occur only where desired I have found it helpful to electrically and thermally isolate the shield bars 20 and 21 from the work. This may be done by applying a ceramic coating 26 to the underside of the bars. A coating 26 in the order of .005 inch thick is normally sufficient to keep the arc column from deviating into the shield bars. It should be noted here that the electrical return is through the workpiece and lead 15. The weld zone, of course, is heated to fusion temperatures, and the thermal insulation helps avoid cracks which may form in the work if heat flows too rapidly from the work material as in the case of conventional "chill bars."

For greater convenience in many applications, the shield shoe 30 shown in FIGURE 2 may be attached to the torch assembly to move with it in generating the weld along the work interface 35. The inner slot 31 is dimensioned as hereinabove explained, and water cooling is provided with inlet and outlet pipes 33 and 34 communicating with water jacket 32. Here, too, a ceramic or other electrically insulating coating on the underside of the shoe is further assurance that the arc will center on a narrow zone along the weld line.

With this invention, weld beads shaped as defined by the lines 25 may be achieved. The narrow, almost straight-sided weld joint is highly desirable and results in a strong union with minimum thermal damage in the zones immediately adjacent to the weld bead. As an example, when welding .375" stainless steel plate using conventional plasma-arc techniques, the width of the bead at the top surface cannot be kept below .375" with the weld zone at the root or under surface being less than .125" in width. Using a shield bar spacing of .1875" as taught herein, the top weld bead width is reduced to slightly less than that spacing while the root width is further reduced somewhat from its former figure. There results an effective weld bead with only a slight broadening of the bead width passing from root to top surface, instead of the characteristic "wineglass" figure obtainable with the best previous techniques.

While I have shown and described a simplified plasma flame generator (which is not a part of the invention per se) it is understood that many varieties of electric arc torches may be used in conjunction with the shield bars of the invention. It is intended to comprehend within the spirit of the invention welding by means of gas stabilized arcs, controlled and applied to the work as taught herein.

I claim:

1. A device for use in welding with a gas stabilized plasma generating electric arc torch comprising a pair of shield bars interposed between said torch and the workpiece, said bars lying on either side of the weld line and defining an arc passageway extending from the work surface toward said torch, and a coating on the work contacting surfaces of said bars to electrically isolate and thermally insulate said bars from said work.

2. A device according to claim 1 in which said bars have bevelled inner edges to define a tapered arc passageway toward said work surface.

3. A device according to claim 1 in which said bars are joined at least one end to form an integral unit capable of moving with said torch along the said weld line.

References Cited by the Examiner

UNITED STATES PATENTS

| | | | |
|---|---|---|---|
| 2,219,352 | 10/1940 | Andrus | 219—76 |
| 3,024,350 | 3/1962 | Skinner et al. | 219—75 |

RICHARD M. WOOD, *Primary Examiner.*